(12) United States Patent
Ito et al.

(10) Patent No.: US 10,599,104 B2
(45) Date of Patent: Mar. 24, 2020

(54) CONTROL DEVICE AND MOTOR CONTROL SYSTEM (71) Applicant: Mitsubishi Electric Corporation, Tokyo (JP)

(72) Inventors: Tatsuya Ito, Tokyo (JP); Toru Otsuka, Tokyo (JP); Yukihiro Makino, Tokyo (JP); Kotaro Nagaoka, Tokyo (JP); Susumu Nakajima, Tokyo (JP); Shinya Nishino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/463,853

(22) PCT Filed: Mar. 31, 2017

(86) PCT No.: PCT/JP2017/013694
§ 371 (c)(1),
(2) Date: May 24, 2019

(87) PCT Pub. No.: WO2018/179366
PCT Pub. Date: Oct. 4, 2018

(65) Prior Publication Data
US 2019/0302705 A1 Oct. 3, 2019

(51) Int. Cl.
G05B 13/02 (2006.01)
G05B 19/23 (2006.01)

(52) U.S. Cl.
CPC ........... *G05B 13/02* (2013.01); *G05B 19/231* (2013.01); *G05B 2219/34013* (2013.01)

(58) Field of Classification Search
CPC .......... G05B 2219/41264; G05B 19/18; B30B 15/0094; B30B 15/148; G01R 31/346
See application file for complete search history.

(56) References Cited

U.S. PATENT DOCUMENTS

| | | | |
|---|---|---|---|
| 2003/0137270 A1* | 7/2003 | Sano | G05B 19/18 318/625 |
| 2013/0041510 A1 | 2/2013 | Kurakake et al. | |
| 2015/0268658 A1* | 9/2015 | Sonoda | G05B 19/19 318/570 |

FOREIGN PATENT DOCUMENTS

| | | |
|---|---|---|
| JP | 62-39158 A | 2/1987 |
| JP | 9-179623 A | 7/1997 |
| JP | 9-269811 A | 10/1997 |

(Continued)

OTHER PUBLICATIONS

International Search Report dated Jun. 6, 2017 for PCT/JP2017/013694 filed on Mar. 31, 2017, 9 pages including English Translation of the International Search Report.

(Continued)

*Primary Examiner* — Shawki S Ismail
*Assistant Examiner* — Zoheb S Imtiaz
(74) *Attorney, Agent, or Firm* — Xsensus LLP (57) ABSTRACT An adaptive control device according to the present invention includes: a processor that generates a second command value for a motor on the basis of at least one of a first command value received from a numerical control device, feedback data received from a motor control device that controls the motor on the basis of the first command value, and sensor data received from a sensor; and a communication circuit that transmits the second command value to the numerical control device.

18 Claims, 6 Drawing Sheets (56) References Cited

FOREIGN PATENT DOCUMENTS

| JP | 2004-78895 A | 3/2004 |
| JP | 2013-54730 A | 3/2013 |
| JP | 2014-140918 A | 8/2014 |
| JP | 2016-52692 A | 4/2016 |

OTHER PUBLICATIONS

Decision to Grant a Patent received for Japanese Patent Application No. 2017-558757, drafted on Nov. 30, 2017, 5 pages including English Translation.

* cited by examiner

CONTROL DEVICE AND MOTOR CONTROL SYSTEM

CROSS-REFERENCE TO RELATED APPLICATION

The present application is based on PCT filing PCT/JP2017/013694, filed Mar. 31, 2017, the entire contents of which are incorporated herein by reference.

FIELD

The present invention relates to a control device and a motor control system in a numerically controlled mechanical system such as a machine tool or a robot.

BACKGROUND

In a mechanical system such as a machine tool or a robot, the rotating direction and the rotation speed of a motor are controlled, so that the position, the speed, the number of revolutions, and the like of an control target to be controlled are controlled. A numerical control device normally generates a command value relating to, for example, the position and the speed at regular time intervals, and a motor control device receives this command value and controls, for example, the rotating direction, and the rotation speed of the motor. As a result, the control target moves to the designated position at the designated speed. The motor control device also receives feedback data relating to the motor drive current and the position and the speed of the control target, and transmits the feedback data to the numerical control device. By performing feedback control using the feedback data, the numerical control device generates command values for the next and subsequent cycles. In this manner, so-called servo control is performed in a mechanical system such as a machine tool or a robot.

Meanwhile, a mechanical system such as a machine tool or a robot is required to control a control target with high accuracy and at high speed. To increase the processing speed and the control accuracy, the processor of the numerical control device should perform more operations per unit time. In addition to the conventional servo control, furthermore, adaptive control, which detects temperature, humidity, and vibration of the control target, and the like with sensors and changes a command value or issues an additional command value in accordance with the sensor-detected results, is performed in order to perform more accurate control. Examples of the adaptive control include: correcting thermal displacement at a machine edge or a tool edge by using a result of detection performed by a temperature sensor; suppressing chatter vibration suppression by using a result of detection performed by an acceleration sensor; and preventing collision by using a result of detection performed by a vision sensor. Performing such adaptive control increases the load on the processor of the numerical control device.

Patent Literature 1 discloses a technique for reducing the load on a host controller, as a technique for avoiding an increase in the load on the processor of a numerical control device. According to this technique, a plurality of communication controllers provided under and connected in a tree structure to a host controller equivalent to a numerical control device, and motor control is shared between the host controller and communication controllers so that the load on the host controller is reduced.

CITATION LIST

Patent Literature

Patent Literature 1: Japanese Patent Application Laid-Open No. 2004-78895

SUMMARY

Technical Problem

According to the technique disclosed in Patent Literature 1, unfortunately, the devices are designed on the assumption that the load is dispersed in advance, and any device is not to be added later. For the technique disclosed in Patent Literature 1, a communication controller interprets a command from the host controller, and calculates a control command for a motor controller. The motor controller at the lower level cannot interpret the command from the host controller, and can receive only the control command from the communication controller. Thus, the communication controllers, which are essential for the technique disclosed in Patent Literature 1, need to be provided from the beginning, and no communication controller can be provided later for a mechanical system not including any communication controller. Meanwhile, the demand for a mechanical system is expected to change. For example, adaptive control on a control target is not taken into consideration at the time of introduction of a mechanical system, but such adaptive control may become necessary thereafter. Further, if changes in the configurations of a numerical control device and a motor control device that is a motor controller are large in scale, the non-operation hours become longer. For this reason, the changes in the configurations of the numerical control device and the motor controller are preferably small.

The present invention has been made in view of the foregoing, and aims to provide a control device that is capable of adding adaptive control of a control target as well as reducing the changes in the configurations of the numerical control device and the motor controller.

Solution to Problem

To solve the above problem and achieve the object, a control device according to the present invention comprises a processor to generate a second command value for a motor on a basis of at least one of: a first command value received from a numerical control device; feedback data received from a motor control device that controls the motor on the basis of the first command value; and sensor data received from a sensor. The control device according to the present invention further comprises a communication circuit to transmit the second command value to the numerical control device.

Advantageous Effects of Invention

The control device according to the present invention achieves the effect of being capable of adding the adaptive control of a control target as well as reducing the changes in the configurations of the numerical control device and the motor controller.

DESCRIPTION OF EMBODIMENTS

The following is a detailed description of control devices and motor control systems according to embodiments of the present invention, with reference to the drawings. Note that the present invention is not limited by these embodiments.

First Embodiment

Figure 1:
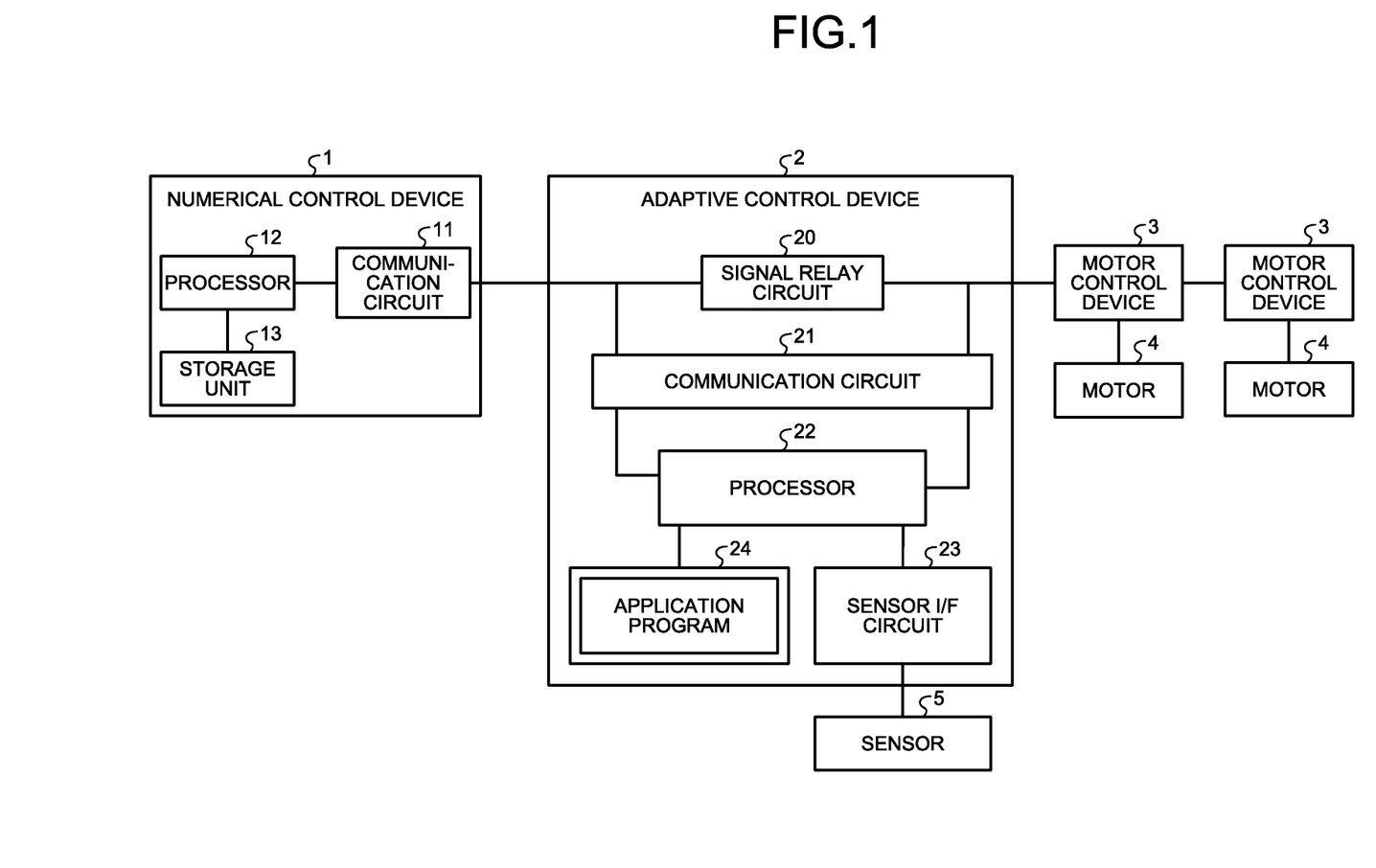
FIG. 1 is a diagram illustrating an example configuration of a motor control system according to a first embodiment.

FIG. 1 is a diagram illustrating an example configuration of a motor control system according to a first embodiment, of the present invention. The motor control system illustrated in FIG. 1 includes a numerical control device 1, an adaptive control device 2, motor control devices 3, and motors 4. Although the adaptive control device 2 illustrated in FIG. 1, which is a control device according to the present invention, is connected between the numerical control device 1 and the motor control devices 3, the motor control system of the present embodiment can operate even if the adaptive control device 2 is not connected thereto. That is, the motor control system of the present embodiment can operate even if the numerical control device 1 is connected to the motor control devices 3 without the adaptive control device 2 being interposed therebetween Although FIG. 1 illustrates two pairs of a motor 4 and a motor control device 3 for driving the motor 4, the number of pairs of the motor 4 and the motor control device 3 for controlling the motor 4 should be at least one, and is not limited to the example illustrated in FIG. 1. Furthermore, the motor 4 and the motor control device 3 that controls the motor 4 are not necessarily paired, and a plurality of motors 4 may be connected to one motor control device 3.

The adaptive control device 2 may be provided between the numerical control device 1 and the motor control device 3 as illustrated in FIG. 1 from the start of operation of the motor control system, or is not provided at the start of operation of the motor control system but may be added later. Further, the adaptive control device 2 is provided at the start of operation of the motor control system, and the adaptive control device 2 may be removed later. Namely, the adaptive control device 2 can be added to the motor control system, and can be removed from the motor control system.

The motor control system of the present embodiment is applied to a mechanical system such as a machine tool or a robot, for example. In a case where the motor control system of the present embodiment is applied to a mechanical system, the motors 4 are connected to mechanical devices (not illustrated), and drives the mechanical devices with rotary torque. In this case, the control target to be controlled by the motor control system is the mechanical devices. The control target to be controlled by the motor control system can also be the mechanical devices and the motors 4 driving the mechanical devices. A mechanical system such as a machine tool or a robot normally has a plurality of shafts. Mechanical devices corresponding to the respective shafts are provided and driven by the motors 4. Further, a sensor (not illustrated) for detecting the position, and the speed, and the like of the mechanical devices may be provided, and the results detected by the sensor may be input to the numerical control device 1.

The numerical control device 1 includes a communication circuit 11, a processor 12, and a storage unit 13. The communication circuit 11 exchanges data with the adaptive control device 2 in accordance with a predetermined communication protocol. The communication circuit 11 is also capable of exchanging data with the motor control devices 3 in accordance with a predetermined communication protocol.

The processor 12 is a central processing unit (CPU), for example, and executes a numerical control program stored in the storage unit 13 or a numerical control program input from the outside. Specifically, for example, the processor 12 interprets the numerical control program stored in the storage unit 13, generates, at regular intervals, a command value for each motor 4 necessary for controlling the control object, and outputs the generated command value to the communication circuit 11. Examples of such numerical control programs include a machining program and a robot control programs. When generating a command value, the processor 12 uses feedback data that will be described later. The communication circuit 11 transmits the command value to the corresponding motor control device 3. More specifically, for example, the communication circuit 11 stores, into the area indicating the destination in the frame, the identification information for identifying the motor control device 3 corresponding to the command value, stores the command value into the data area in the frame, and transmits the frame to the communication line between the communication circuit 11 and the motor control device 3.

The storage unit 13 is a memory that can store programs, data, and the like, and is, for example, a semiconductor memory such as a read only memory (ROM), a random access memory (RAM), or a flash memory, or a magnetic disk.

The motor control device 3 generates a drive signal for driving the corresponding motor 4, on the basis of a command value received from the numerical control device 1 via the adaptive control device 2, and applies the generated drive signal to the motor 4. The motor 4 rotates on the basis of the drive signal. In a case where the motor 4 drives a mechanical device, the mechanical device is driven by the rotary torque of the motor 4. The motor control device 3 also transmits feedback data such as the position, the speed, and the current, and the like of the motor 4, to the numerical control device 1. Specifically, in accordance with a predetermined communication protocol, for example, the motor control device 3 stores the identification information for identifying the numerical control device 1, into the area indicating the destination in the frame, stores feedback data into the data area in the frame, and transmits the frame to the communication line between the motor control device 3 and the numerical control device 1.

The adaptive control device 2 includes a signal relay circuit 20, a communication circuit 21, a processor 22, a sensor interface (I/F) circuit 23, and a storage unit 24. The signal relay circuit 20, which is connected to the communication line between the numerical control device 1 and the motor control device 3, allows a command value transmitted from the numerical control device 1 to electrically pass therethrough without any change to the command value, thereby transmitting the command value to the motor control device 3. The signal relay circuit 20 also allows feedback data transmitted from the motor control device 3 to electrically pass therethrough without any change to the feedback data, thereby transmitting the feedback data to the numerical control device 1. The communication circuit 21 is capable of exchanging data with the numerical control device 1 in accordance with a predetermined communication protocol. The sensor I/F circuit 23 receives, from the sensor 5, sensor data that is data detected by a sensor 5. The sensor 5 may be of any kind, and is installed in accordance with the contents of adaptive control that will be described later. Examples of the sensor 5 include a temperature sensor, an acceleration sensor, a gyroscope sensor, and a vision sensor.

The processor 22, which is a CPU or the like, reads and executes an application program that is an adaptive control program stored in the storage unit 24. By doing so, the processor 22 extracts the data required for adaptive control from the command value transmitted from the numerical control device 1 and the feedback data transmitted from the motor control device 3. On the basis of the extracted data and the sensor data received from the sensor I/F circuit 23, the processor 22 performs an adaptive control operation (to be described later), and generates a command value for adaptive control. Specifically, the processor 22 performs an adaptive control operation, on the basis of at least one of: a servo control command value that is a first command value received from the numerical control device 1; feedback data received from a motor control device 3 that controls the corresponding motor 4 on the basis of the first command value; and sensor data received from the sensor. The processor 22 further generates an adaptive control command value that is a second command value for the motor 4, on the basis of the adaptive control operation. The processor 22 transmits the command value for adaptive control, to the numerical control device 1 via the communication circuit 21.

The storage unit 24 is a memory that can store programs, data, and the like, and is, for example, a semiconductor memory such as a read only memory (ROM), a random access memory (RAM), or a flash memory, or a magnetic disk.

Figure 2:
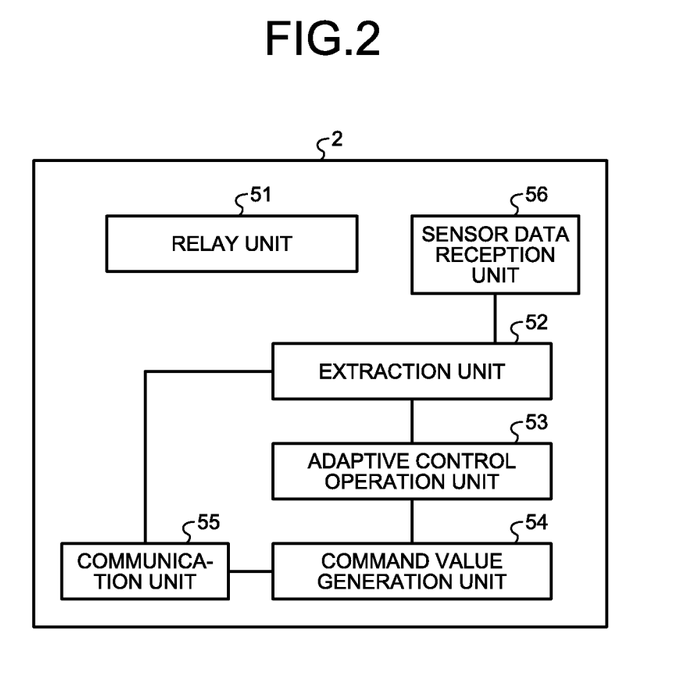
FIG. 2 is a diagram illustrating an example functional configuration of an adaptive control device according to the first embodiment.

Next, the functional configurations and operations of the respective devices of the present embodiment are described. FIG. 2 is a diagram illustrating an example functional configuration of the adaptive control device 2 according to the present embodiment. The adaptive control device 2 includes a relay unit 51, an extraction unit 52, an adaptive control operation unit 53, a command value generation unit 54, a communication unit 55, and a sensor data reception unit 56. The relay unit 51 is implemented by the signal relay circuit 20 illustrated in FIG. 1. The communication unit 55 is implemented by the communication circuit 21 and the processor 22 illustrated in FIG. 1. The sensor data reception unit 56 is implemented by the sensor I/F circuit 23 illustrated in FIG. 1. The extraction unit 52, the adaptive control operation unit 53, and the command value generation unit 54 are implemented by the processor 22 illustrated in FIG. 1. Specifically, a program stored in the storage unit 24 and designed for implementing a part of the communication unit 55, the extraction unit 52, the adaptive control operation unit 53, and the command value generation unit 54 is read and executed by the processor 22 to thereby implement the part of the communication unit 55, the extraction unit 52, the adaptive control operation unit 53, and the command value generation unit 54.

The relay unit 51 allows a command value transmitted from the numerical control device 1 to pass therethrough without any change to the command value, thereby transmitting the command value to the motor control device 3. The relay unit 51 also allows feedback data transmitted from the motor control device 3 to pass therethrough without any change to the feedback data, thereby transmitting the feedback data to the numerical control device 1. The communication unit 55 receives the command value transmitted from the numerical control device 1, and outputs the received command value to the extraction unit 52. The communication unit 55 also receives the feedback data transmitted from the motor control device 3, and outputs the received feedback data to the extraction unit 52. The sensor data reception unit 56 receives sensor data, and passes the received sensor data to the extraction unit 52.

The extraction unit 52 extracts, from among the input command value, the feedback data, and the sensor data, the data necessary for an adaptive control operation that will be described later, and passes the extracted data to the adaptive control operation unit 53. The adaptive control operation unit 53 performs an adaptive control operation, using the data input from the extraction unit 52. In a case where the result of the adaptive control operation makes the adaptive control operation unit. 53 determine that there is the need to change the command value, the adaptive control operation unit 53 notifies the command value generation unit 54 accordingly. The command value generation unit 54 generates a command value for adaptive control, on the basis of the notification from the adaptive control operation unit 53, and outputs the generated command value for adaptive control, to the communication unit 55. The notification from the adaptive control operation unit 53 is generated on the basis of at least one of: the first command value transmitted from the numerical control device 1; the feedback data; and the sensor data. Accordingly, the command value generation unit 54 generates the command value for adaptive control, which is the second command value for the motor, on the basis of at least one of: the first command value; the feedback data; and the sensor data received from the sensor. The command value for adaptive control, which is input from the command value generation unit 54, is transmitted by communication unit 55 to the numerical control device 1. The command value for adaptive control is hereinafter referred to as "adaptive control command value".

The adaptive control operation is an operation for adaptive control. For example, assume that the motor control system of the present embodiment is applied to a machine tool, the motors 4 drive tools, and adaptive control is to be performed for reducing chatter vibration. In this case, an acceleration sensor that detects acceleration of a tool or a workpiece is included in the sensor 5, and the adaptive control operation unit 53 performs fast Fourier transform (FFT) on sensor data detected by the acceleration sensor. As a result, the adaptive control operation unit 53 can detect the frequency of the vibration of the tool or the workpiece and its intensity that is the amplitude. The adaptive control operation unit 53 determines whether a chatter vibration occurs, by performing threshold determination or the like on the frequency and/or the intensity of the vibration obtained through the FFT. If the adaptive control operation unit 53 determines that the chatter vibration occurs, the adaptive control operation unit 53 determines that it is necessary to change the command value, and notifies the command value generation unit 54 that the command value should be changed because of the occurrence of chatter vibration. Upon being notified of the occurrence of chatter vibration, for example, the command value generation unit 54 generates a command value that provides an instruction to change the number of rotation of the motor 4 corresponding to the spindle of the machine tool. The command value generation unit 54 then outputs the generated command value to the communication unit 55. Note that what kind of command value is to be generated when chatter vibration is detected may be determined in advance, or may be set by the user.

Other than the above described chatter vibration reduction, adaptive control may be control such as collision prevention using a result, of detection performed by a vision sensor. The contents of the adaptive control operation to be performed by the adaptive control operation unit 53 are determined in accordance with the type of the adaptive control to be performed, and there are no restrictions on the operation contents. In a case where the adaptive control operation unit 53 detects a plurality of kinds of events, and the contents of change to the command value vary depending upon detected events, for example, detected events and the contents of change to the command value changes are associated with each other, and are set in advance.

Figure 3:
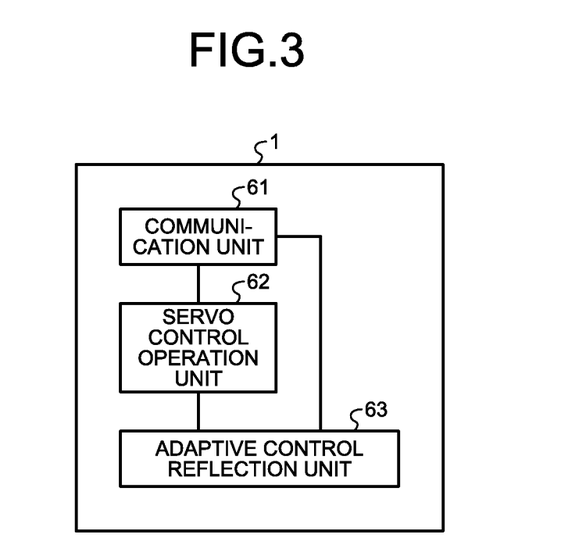
FIG. 3 is a diagram illustrating an example functional configuration of a numerical control device according to the first embodiment.

FIG. 3 is a diagram illustrating an example functional configuration of the numerical control device 1. As illustrated in FIG. 3, the numerical control device 1 includes a communication unit 61, a servo control operation unit 62, and an adaptive control reflection unit 63. The communication unit 61 is implemented by the communication circuit 11 and the processor 12 illustrated in FIG. 1. The servo control operation unit 62 and the adaptive control reflection unit 63 are implemented by the processor 12 illustrated in FIG. 1. Specifically, a program stored in the storage unit 13 and designed for implementing part of the communication unit 61, the servo control operation unit 62, and the adaptive control reflection unit 63 are read and executed by the processor 12, thereby implementing the part of the communication unit 61, the servo control operation unit 62, and the adaptive control reflection unit 63.

Upon receiving feedback data transmitted from the motor control device 3, the communication unit 61 passes the feedback data to the servo control operation unit 62. The communication unit 61 also transmits, to the motor control device 3, a later described servo control command value received from the adaptive control reflection unit 63. At each control cycle, the servo control operation unit 62 performs a servo control operation on the basis of the feedback data received from the communication unit 61. The servo control operation is an operation to generate a servo control command value. The servo control operation unit 62 passes the generated servo control command value to the adaptive control reflection unit 63. There are no restrictions on the contents of the servo control operation to be performed by the servo control operation unit 62, and any appropriate operation in the servo control for controlling the motor 4 may be used.

When receiving an adaptive control command value from the adaptive control device 2, the adaptive control reflection unit 63 reflects the adaptive control command value in the command value that is to be next transmitted to the motor control device 3. Specifically, upon receiving the adaptive control command value from the adaptive control device 2, the adaptive control reflection unit 63 corrects the servo control command value on the basis of the received adaptive control command value. For example, in a case where the adaptive control reflection unit 63 receives the adaptive control command value from the adaptive control device 2, the adaptive control reflection unit 63 reflects the adaptive control command value in a command value received from the servo control operation unit 62 for the first time after receiving the adaptive control command value. If the adaptive control command value means that, for example, the rotation speed should be decreased 100 rpm, the adaptive control reflection unit 63 outputs, to the communication unit 61, a command value that is a value obtained by subtracting 100 rpm from the rotation speed indicated by the command value received from the servo control operation unit 62 for the first time after receiving the adaptive control command value. During receipt of no adaptive control command value from the adaptive control device 2, the adaptive control reflection unit 63 outputs the command value received from the servo control operation unit 62, to the communication unit 61 without any change to the command value. Accordingly, in a case where an adaptive control command value is transmitted from the adaptive control device 2, a command value reflecting the adaptive control command value is transmitted to the motor control device 3 in accordance with the same communication protocol as in a case where adaptive control is not performed. Note that an adaptive control command value may indicate the amount of change in a servo control command value as in the above described example, or may indicate the changed command value such as the changed rotation speed.

Further, in a case where the adaptive control device 2 is not provided, any adaptive control command value is not transmitted from the adaptive control device 2. In this case, accordingly, the adaptive control reflection unit 63 outputs, directly to the communication unit 61, a command value received from the servo control operation unit 62. On the basis of a command value transmitted from the numerical control device 1, therefore, the motor control device 3 may control the motor 4 in accordance with the same procedures regardless of whether the adaptive control device 2 is present or absent.

Figure 4:
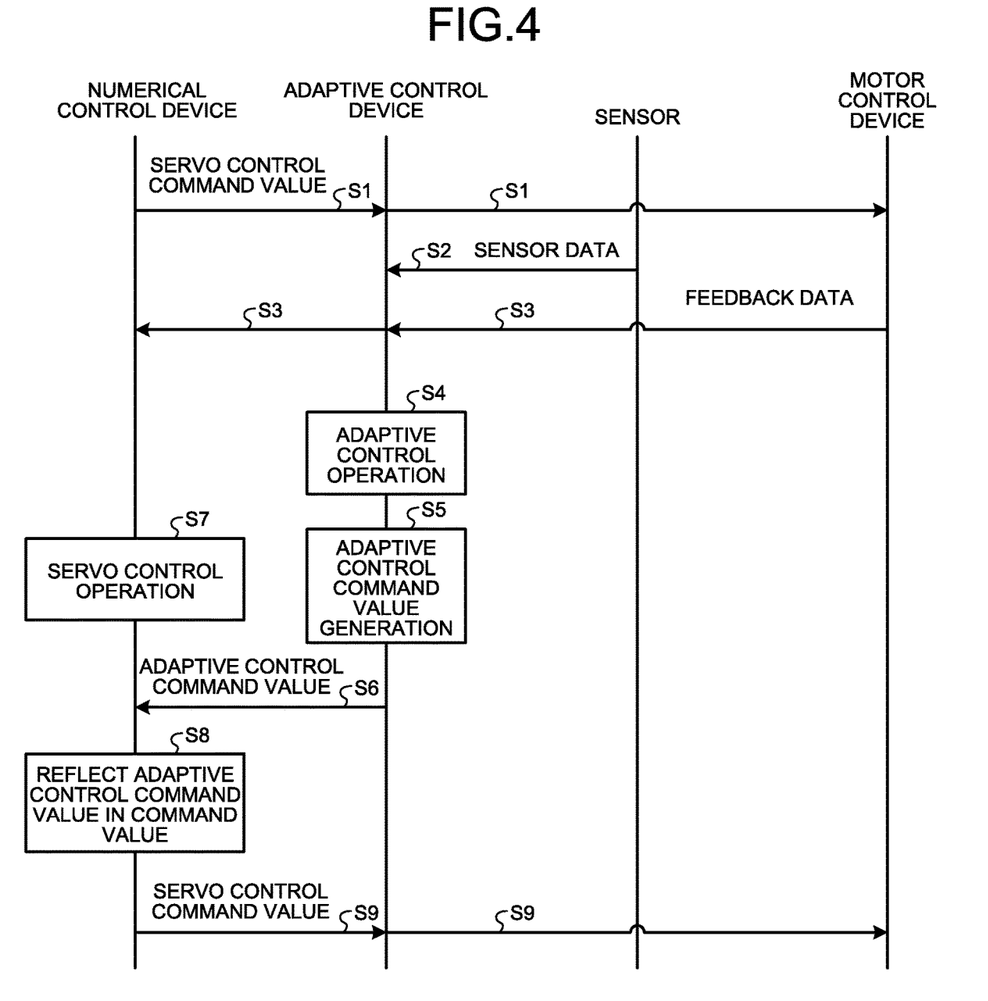
FIG. 4 is a sequence diagram illustrating an example operation in the motor control system according to the first embodiment.

FIG. 4 is a sequence diagram illustrating an example operation in the motor control system of the present embodiment. An example of the operation procedures to be carried out by each of the devices of the motor control system of the present embodiment is described below with reference to FIGS. 2, 3, and 4.

As illustrated in FIG. 4, the numerical control device 1 transmits a servo control command value. Upon receiving the servo control command value from the numerical control device 1, the adaptive control device 2 allows the servo control command value to pass therethrough to the motor control device 3 without any change to the servo control command value (step S1). This servo control command value reflects an adaptive control command value if the adaptive control command value was received one previous control cycle ago; however, the servo control command value is a command value generated by a servo control operation if any adaptive control command value was not received the one control cycle ago. The adaptive control device 2 receives sensor data from the sensor 5 (step S2). The motor control device 3 operates on the basis of the command value received the one control cycle ago, and transmits feedback data. Upon receiving the feedback data from the motor control device 3, the adaptive control device 2 allows the feedback data to pass therethrough to the numerical control device 1 without any change to the feedback data (step S3). The adaptive control device 2 performs the above-described adaptive control operation (step S4), generates an adaptive control command value on the basis of the adaptive control operation (step S5), and transmits the generated adaptive control command value to the numerical control device 1 (step S6).

The numerical control device 1 performs a servo control operation, using the received feedback data (step S7), and reflects, in the command value generated by the servo control operation, the adaptive control command value received from the adaptive control device 2 (step S8). The numerical control device 1 transmits, to the motor control device 3, the command value with the adaptive control command value reflected therein (step S9).

The period from the transmission of the command value in step S1 till the transmission of the command value in step S9 illustrated in FIG. 4 corresponds to one control cycle, or the control cycle for a servo operation. FIG. 4 illustrates an example of the timings at which to transmit the servo control command value, the feedback data, and the adaptive control command value within a control cycle, these timings are not limited to this example illustrated in FIG. 4. Each of the devices performs the above described operation on a per control-cycle basis. Although FIG. 4 illustrates an example in which the determination to transmit an adaptive control command value is made as a result of an adaptive control operation, an adaptive control command value may not be transmitted in a case where it is determined that any adaptive control command value is not to be transmitted. Alternatively, in a case where it is determined that any adaptive control command value is not to be transmitted, the adaptive control device 2 may transmit an adaptive control command value indicating that there is no need to change the servo control command value; for example, the adaptive control device 2 may transmit an adaptive control command value indicating that an amount of change is 0.

Note that the cycle at which to receive the sensor data and the cycle at which to perform an adaptive control operation are not necessarily the same as the control cycle for servo control. Further, in the example illustrated in FIG. 4, the reflection of the adaptive control command value in a servo operation command value is performed in the next control cycle following the control cycle in which the adaptive control command value is transmitted. However, depending on the timing at which to receive an adaptive control command value, the numerical control device 1 may reflect the adaptive control command value within the control cycle in which the adaptive control command value is received.

Next, a specific example of a method for transmitting an adaptive control command value from the adaptive control device 2 to the numerical control device 1 is described. In a case where the communication line between the numerical control device 1 and the motor control device 3 is a communication line according to a communication protocol for performing cyclic communication, it is necessary to set the communication period for an adaptive control command value in a communication cycle, in order for the adaptive control device 2 to transmit an adaptive control command value to the numerical control device 1 through this communication line. Assume that the communication period corresponding to each data in a communication cycle is set for the two directions: a downstream direction that is the direction of transmission from the numerical control device 1 to the motor control device 3; and an upstream direction that is the direction of transmission from the motor control device 3 to the numerical control device 1. In a motor control system, a communication cycle normally matches a control cycle. In view of the above, determining the communication period for feedback data and the communication period for an adaptive control command value in a control cycle in communication in the upstream direction enables the numerical control device 1 to receive both the feedback data and the adaptive control command value, using the communication line between the numerical control device 1 and the motor control device 3.

Figure 5:
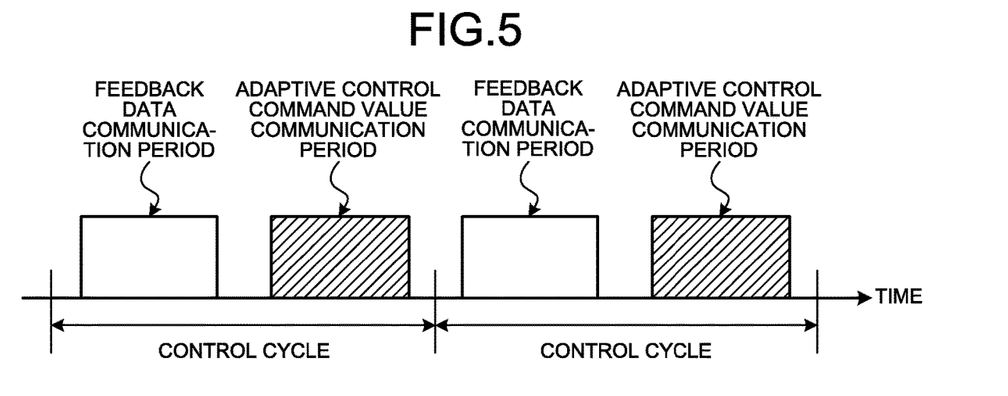
FIG. 5 is a diagram illustrating an example of the communication period for feedback data and the communication period for an adaptive control command value in a control cycle according to the first embodiment.

FIG. 5 is a diagram illustrating an example of the communication period for feedback data and the communication period for an adaptive control command value in a control cycle. FIG. 5 illustrates an example in which, within the control cycle, the adaptive control command value communication period, which is the communication period for an adaptive control command value, comes after the feedback communication period. However, the arrangement of the respective communication periods in the control cycle is not limited to this example, and any arrangement is possible as long as the respective communication periods do not overlap in the control cycle.

Note that, in a case where there is another communication line (not illustrated) between the numerical control device 1 and the adaptive control device 2, the adaptive control device 2 may use this communication line to transmit an adaptive control command value to the numerical control device 1. In this case, there is no need to set the communication period for an adaptive control command value in the control cycle.

Note that, in a case where the numerical control device 1 includes the adaptive control reflection unit 63 as illustrated in FIG. 3 from the beginning and the communication unit 61 is compatible with the reception processes in the respective communication periods illustrated in FIG. 5, there is no need to make any change to the numerical control device 1 even if the adaptive control device 2 is installed later.

Meanwhile, the adaptive control device 2 of the present embodiment can also be applied to an existing motor control system. The term "existing motor control system" as used herein means a motor control system in which the numerical control device 1 does not include the adaptive control reflection unit 63 illustrated in FIG. 3 but has a servo control operation function. In a case where the adaptive control device 2 of the present embodiment is added to the conventional motor control system, the software of the numerical control device 1 is changed so that the functions of the adaptive control reflection unit 63 can be achieved, and the reception processes in the respective communication periods illustrated in the example in FIG. 5 can be performed. The increase in the load on the numerical control device 1 due to this software change is minor.

As described above, in the present embodiment, the adaptive control device 2 performs adaptive control and transmits an adaptive control command value to the numerical control device 1, and the numerical control device 1 reflects the adaptive control command value in the command value that is to be transmitted to the corresponding motor control device 3. For even the motor control system not permitted to greatly increase the load on the processor of the numerical control device or even the existing conventional motor control system, highly sophisticated adaptive control based on sensor data, feedback data, and the like can be performed reducing the increase in the load on the processor of the numerical control device 1 without making any change to the configuration of the motor control device 3. That is, in the present embodiment, the adaptive control for the control target can be added reducing changes in the configurations of the numerical control device 1 and the motor control devices 3.

Second Embodiment

Next, a motor control system according to a second embodiment of the present invention is described. The configuration of the motor control system of the present embodiment is the same as the configuration of the motor control system of the first embodiment. The configurations of the respective devices defining the motor control system are also the same as those of the first embodiment. In the description below, the different aspects from the first embodiment will be mainly described, and the same explanation as the explanation of the first embodiment will not be repeated.

In the first embodiment, the adaptive control device 2 transmits an adaptive control command value to the numerical control device 1, and the numerical control device 1 generates a servo control command value reflecting the adaptive control command value. In the second embodiment, the adaptive control device 2 transmits an adaptive control command value not only to the numerical control device 1 but also to the corresponding motor control device 3.

Figure 6:
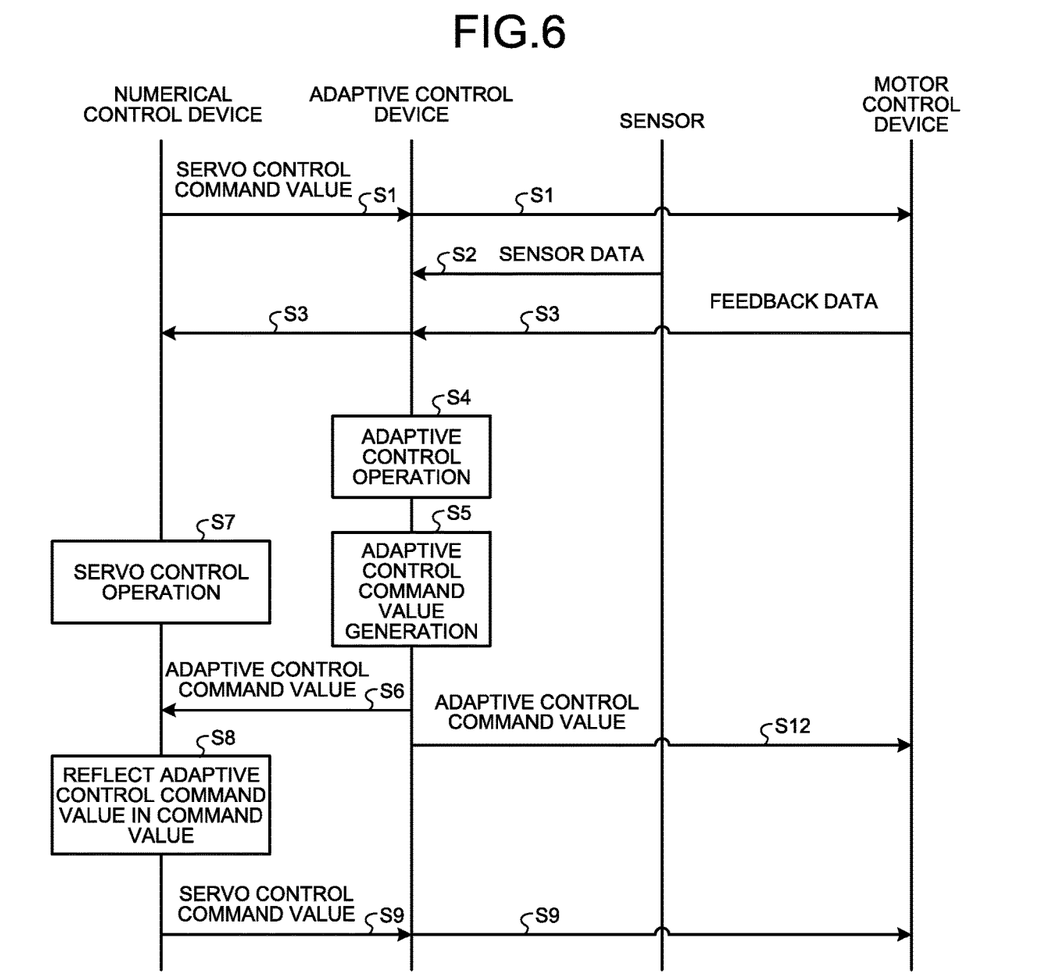
FIG. 6 is a sequence diagram illustrating an example operation in the motor control system according to a second embodiment.

FIG. 6 is a sequence diagram illustrating an example operation in the motor control system of the present embodiment. Steps S1 through S5 are the same as steps S1 through S5 in the first embodiment. After step S5, the communication unit 55 of the adaptive control device 2 transmits an adaptive control command value to the numerical control device 1 (step S11), and also transmits the adaptive control command value to the motor control device 3 (step S12). Steps S7 through S9 are the same as steps S7 through S9 in the first embodiment. Upon receiving the adaptive control command value, the motor control device 3 controls the motor 4 on the basis of the received adaptive control command value and the servo control command value received in step S1. Further, in controlling the motor 4 on the basis of both the adaptive control command value and the servo control command value, a method for controlling the motor is determined in advance, such as putting priority on the adaptive control command value when the servo control command value and the adaptive control command value are different command values. For example, when the servo control command value is a command indicating a rotation speed of 1000 rpm while the adaptive control command value is a command indicating a rotation speed of 900 rpm, the motor control device 3 performs control in accordance with the adaptive control command value so that the rotation speed of the motor becomes 900 rpm.

In the present embodiment, an adaptive control command value is transmitted to the motor control device 3 without intervention of the numerical control device 1, and thus, the adaptive control command value is transmitted to the motor control device 3 faster than in the first embodiment. Accordingly, the adaptive control can be more quickly reflected than in the first embodiment. Note that, in the numerical control device 1, the adaptive control command value is also reflected in the command value for the next control cycle. Accordingly, in the next and subsequent cycles, the command value transmitted from the numerical control device 1 reflects the adaptive control command value, and thus, the numerical control device 1 can prevent command value mismatching between the numerical control device 1 and the motor control device 3.

Figure 7:
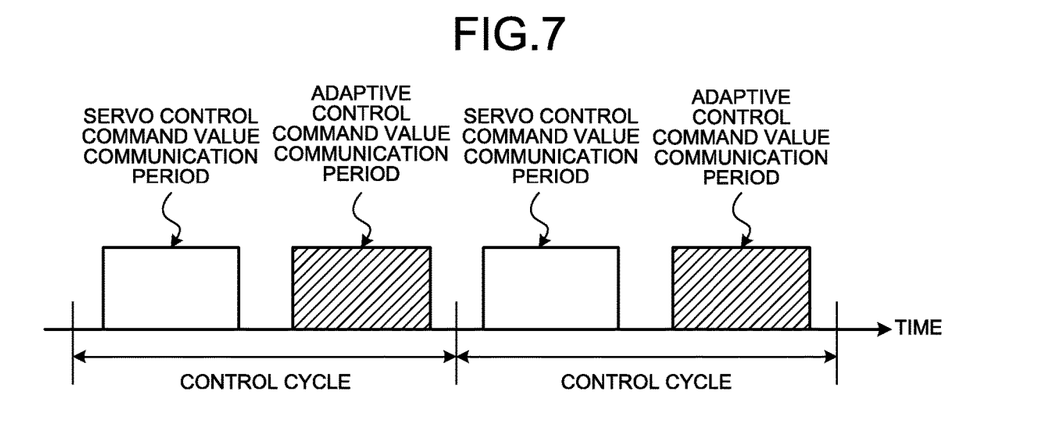
FIG. 7 is a diagram illustrating an example of the communication period for a servo control command value and the communication period for an adaptive control command value in a control cycle according to the second embodiment.

A specific example of a method for transmitting an adaptive control command value from the adaptive control device 2 to the numerical control device 1 is now described. As in the first embodiment, transmission of an adaptive control command value from the adaptive control device 2 to the numerical control device 1 can be performed using the communication line between the numerical control device 1 and the motor control device 3. FIG. 7 is a diagram illustrating an example of the communication period for a servo control command value and the communication period for an adaptive control command value in a control cycle. In FIG. 7, the communication periods for the upstream direction and the downstream direction within the control cycle are determined, as described in the example illustrated in FIG. 5 according to the first embodiment of the present invention. As illustrated in FIG. 7, in communication in the downstream direction, the communication period for an adaptive control command value comes after the communication period for a servo control command value in the control cycle. However, the arrangement of the respective communication periods in the control cycle is not limited to this example, and any arrangement is possible as long as the respective communication periods do not overlap in the control cycle.

Note that, in a case where there is another communication line (not illustrated) between the numerical control device 1 and the adaptive control device 2, the adaptive control device 2 may use this communication line to transmit an adaptive control command value to the numerical control device 1. In this case, there is no need to set the communication period for an adaptive control command value in the control cycle. Note that, in the present embodiment, the motor control device 3 needs to have the function of receiving an adaptive control command value, and the function of selecting either an adaptive control command value or a servo control command value. Therefore, in a case where the motor control device 3 does not have these functions, the software is modified to achieve these functions. This software modification is minor, and the increase in the load on the motor control devices 3 is also minor.

As described above, in the present embodiment, the adaptive control device 2 transmits an adaptive control command value not only to the numerical control device 1 but also to the corresponding motor control device 3. Thus, the same effects as the effects of the first embodiment can be achieved, and an adaptive control command value can be transmitted to the motor control device at a higher speed than that with the motor control system according to the first embodiment.

Third Embodiment

Figure 8:
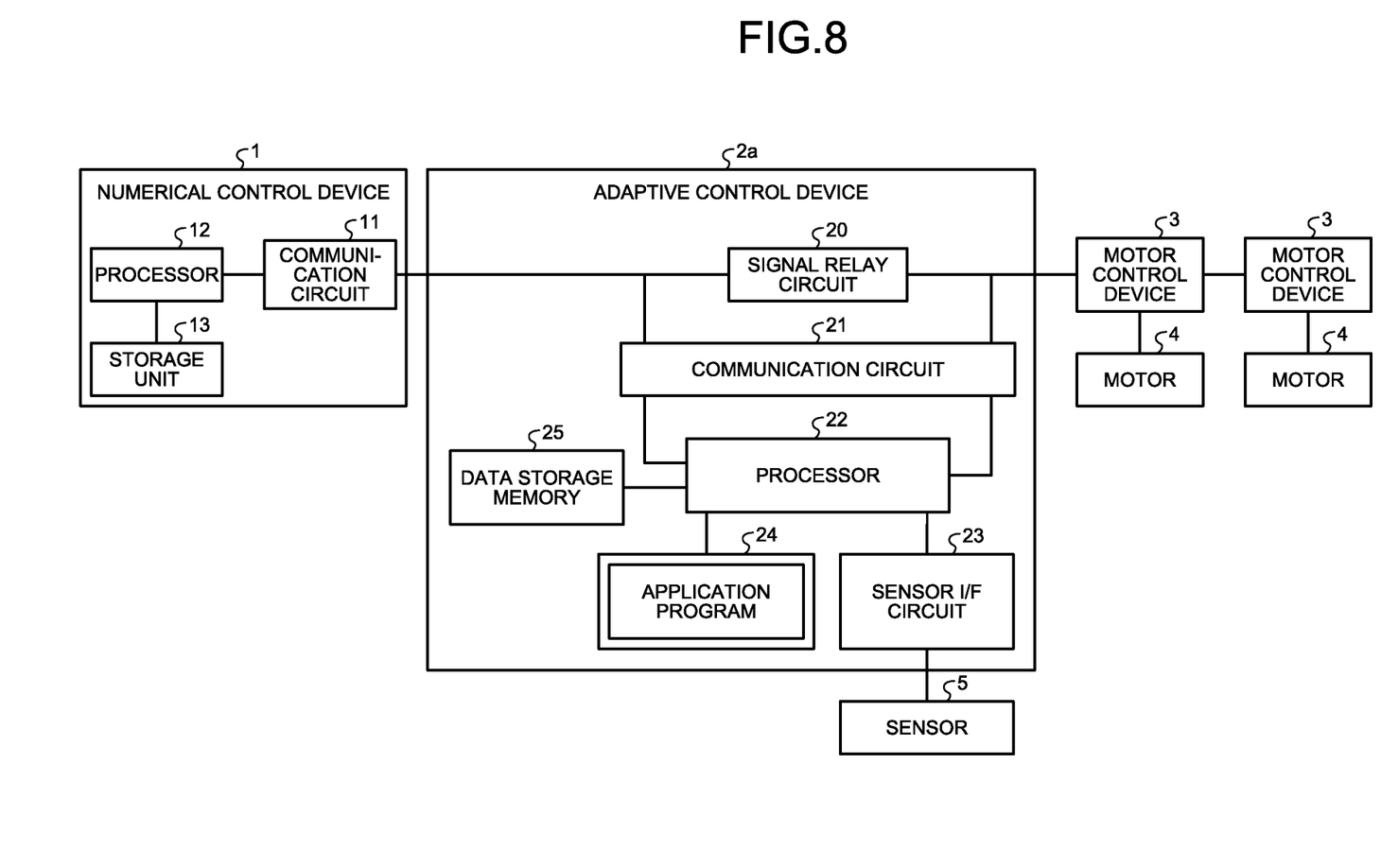
FIG. 8 is a diagram illustrating an example configuration of a motor control system according to a third embodiment.

FIG. 8 is a diagram illustrating an example configuration of a motor control system according to a third embodiment of the present invention. As illustrated in FIG. 8, the motor control system of the present embodiment is the same as the motor control system of the first embodiment, except for including an adaptive control device 2a in place of the adaptive control device 2. The adaptive control device 2a has the same configuration as the adaptive control device 2 of the first embodiment, except for further including a data storage memory 25. The components having the same functions as those of the first embodiment are denoted by the same reference numerals as the reference numerals used in the first embodiment, and the same explanation as the explanation of the first embodiment is not repeated herein. In the description below, the different aspects from the first embodiment will be mainly explained.

In the present embodiment, the processor 22 selects data that needs storing, from among sensor data, feedback data, and a servo control command value, and stores the selected data in the data storage memory 25 for a certain period of time. That is, the data storage memory 25 is a memory that stores at least one of: a servo control command value that is the first command value; feedback data; and sensor data. The data that needs storing is the data to be used for analysis based on the past data as described later. The processor 22 performs an adaptive control operation on the basis of the data stored in the data storage memory 25. Note that the data storage memory 25 and the storage unit 24 may be implemented by a single memory.

Although the data storage memory 25 is included in the adaptive control device 2a in FIG. 8, the present embodiment is not limited to this example, and the adaptive control device 2a may include an external storage medium I/F unit that exchange data with an external storage medium such as a universal serial bus (USB) memory or an SD card, and use an external storage medium as the data storage memory 25. Alternatively, the adaptive control device 2a may include a local area network (LAN) I/F unit, and use a memory such as a hard disk drive (HDD) or a data server outside the adaptive control device 2a, as the data storage memory 25 via these I/F units. Further, the selected data may be stored in both the data storage memory 25 in the adaptive control device 2a and an external memory such as a hard disk drive (HDD) or a data server memory. That is, the adaptive control device 2a may store at least one of a servo control command value, feedback data, and sensor data in an external memory provided outside the adaptive control device 2a.

The functional configurations of the respective devices of the present embodiment are the same as the example functional configurations of the first embodiment. However, the adaptive control operation unit 53 of the adaptive control device 2a of the present embodiment is implemented by not only the processor 22 and the storage unit 24, but also the data storage memory 25. Operation of the adaptive control operation unit 53 according to the present embodiment is now described.

Upon receiving, from the extraction unit 52, the data necessary for an adaptive control operation, the adaptive control operation unit 53 selects and stores the data that needs storing. For example, for a machine tool, a robot, or the like, control of the same locus might be repeatedly performed. In such a case, the adaptive control operation unit 53 stores, in the data storage memory 25, a position command value and the position feedback data corresponding to the position command value. The adaptive control operation unit 53 then calculates an error between the position command value in the past same past locus stored in the data storage memory 25 and the position feedback data corresponding to the position command value, and corrects the position command value in such a manner that the error becomes smaller, thereby moving the actual position of the control target closer to the originally designated position. Further, in a case where thermal displacement correction using temperature data is to be performed, for example, the adaptive control operation unit 53 stores the temperature data in the data storage memory 25, and uses the past temperature data stored in the data storage memory 25 and position error data that is an error between the position command value and the position feedback data corresponding to the position command value. Thus, more accurate thermal displacement correction can be performed.

Note that, in the above example, the data storage memory 25 is added to the motor control system of the first embodiment. However, in the motor control system of the second embodiment, the data storage memory 25 may be added to the inside and/or the outside of the adaptive control device 2, so that adaptive control using the past data can be performed as in the present embodiment.

As described above, in the present embodiment, the data storage memory 25 is provided inside and/or outside the adaptive control device 2a. Thus, the same effects as the effects of the first embodiment can be achieved, and more accurate adaptive control using the past data can be performed.

Fourth Embodiment

Next, a motor control system according to a fourth embodiment of the present invention is described. The configuration of the motor control system of the present embodiment is the same as the configuration of the motor control system of the first embodiment. The configurations of the respective devices defining the motor control system are also the same as those of the first embodiment. Further, operation of the present embodiment is the same as the operation of the motor control system of the first embodiment, except that the operation described below is added to the operation of the motor control system of the first embodiment. In the description below, the different aspects from the first embodiment will be mainly described, and the same explanation as the explanation of the first embodiment will not be repeated.

If the numerical control device 1 is normal, the numerical control device 1 outputs a servo control command value having correct contents at correct timing. In a case where the numerical control device 1 becomes unable to output a servo control command value due to a failure or the like, the corresponding motor control device 3 determines that some abnormality has occurred, and normally decelerates the motor 4 urgently. In a mechanical system in which a plurality of shafts operate in synchronization, however, if each of the motors 4 corresponding to the respective shafts is decelerated urgently without the relationship with the other shafts being taken into account, the tool, the workpiece, the robot arm, and the like to be controlled might collide with each other and be damaged in some cases. To prevent this in the present embodiment, the adaptive control operation unit 53 of the adaptive control device 2 also has the functions of an abnormality monitoring unit that performs an abnormality monitoring process, and monitors servo control command values being generated by the numerical control device 1. If the adaptive control operation unit 53 detects an abnormality in a servo control command value, the adaptive control operation unit 53 generates a deceleration command value for the corresponding motor control device 3, instead of the numerical control device 1, so that the tool, the workpiece, the robot arm, and the like will not collide with each other. The generated command value is then transmitted as an adaptive control command value to the motor control device 3.

Figure 9:
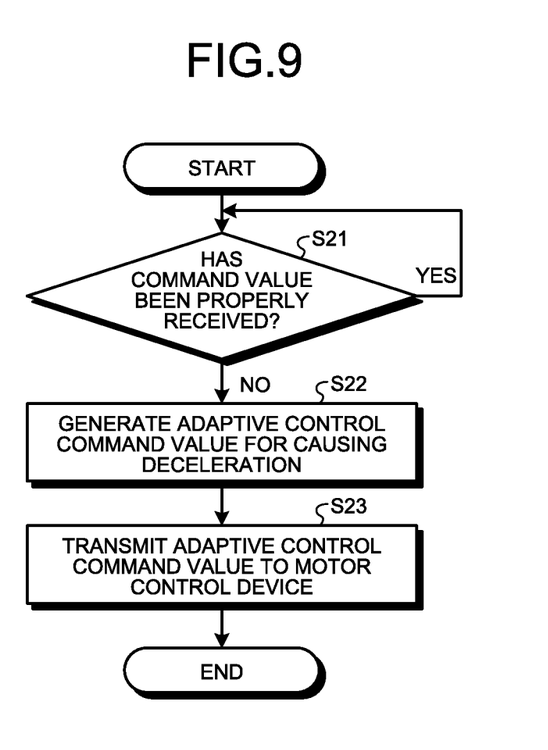
FIG. 9 is a flowchart illustrating an example of the procedures in an abnormality monitoring process according to a fourth embodiment.

FIG. 9 is a flow chart illustrating an example of the procedures in the abnormality monitoring process according to the third embodiment. The adaptive control operation unit 53 receives, from the extraction unit 52, a command value that is a servo control command value transmitted from the numerical control device 1, and determines whether the command value has been properly received (step S21). Whether a command value has been properly received is determined as follows, for example. When the command value has not been received from the numerical control device 1 over a certain period of time, the command value is determined not to have been properly received. Otherwise, the command value is determined to have been properly received. Alternatively, when the received command value deviates from a predetermined normal range, the adaptive control operation unit 53 also determines that the command value has not been properly received. If the command value has been properly received (Yes in step S21), the adaptive control operation unit 53 repeats step S21.

If the command value has not been properly received (No in step S21), or if an abnormality in the command value is detected, the adaptive control operation unit 53 generates an adaptive control command value for decelerating the motor 4 (step S22). The adaptive control command value that is transmitted in a case where an abnormality in a command value is detected is a third command value. The adaptive control operation unit 53 transmits the adaptive control command value, which is the third command value, to the motor control device 3 via the communication unit 55 (step S23), and ends the abnormality monitoring process. Note that, in a case where there is a plurality of motors 4, the adaptive control command value is transmitted to the motor control device 3 so as to decelerate the plurality of motors 4 in step S23. Note that the command value for decelerating the motor 4 may be a command value for stopping the motor 4. Further, if the result in step S21 is No, the adaptive control operation unit 53 may notify the user of the abnormality, using a display unit (not illustrated), a buzzer (not illustrated), or the like. Although the abnormality monitoring process comes to an end after step S23 in FIG. 9, the process may return to step S21.

The method described in the second embodiment may be used as the method of transmitting an adaptive control command value from the adaptive control device 2 to the motor control device 3 in this example.

As described above, in the present embodiment, when the adaptive control device 2 detects that a servo control command value has not been properly received, an adaptive control command value for decelerating the corresponding motor 4 is sent to the corresponding motor control device 3. Thus, in addition to achieving the same effects as the effects of the first embodiment, it becomes possible to safely stop the motor of each shaft without any damage to the control target such as the tool, the workpiece, and the robot arm in a case where the numerical control device 1 becomes unable to output a servo control command value due to a failure or the like.

Although the procedures in the abnormality monitoring process are added to the motor control system of the first embodiment in the above example, the procedures in the abnormality monitoring process may be added to the motor control system of the second embodiment or the third embodiment.

The configuration described in the above embodiments is merely an example of the contents of the present invention, and may be combined with some known technique. Further, it is also possible to omit or modify part of the configuration, without departing form the scope of the invention.

REFERENCE SIGNS LIST

1 numerical control device; 2, 2*a* adaptive control device; 3 motor control device; 4 motor; 11, 21 communication circuit; 12, 22 processor; 13, 24 storage unit; 20 signal relay circuit; 23 sensor I/F circuit; 25 data storage memory; 51 relay unit; 52 extraction unit; adaptive control operation unit; 54 command value generation unit; 55, 61 communication unit; 62 servo control operation unit; 63 adaptive control reflection unit.

The invention claimed is:

1. A control device comprising:
circuitry configured to generate a second command value for a motor on a basis of at least one of:
  a first command value received from a numerical controller;
  feedback data received from a motor controller that controls the motor on the basis of the first command value; and
  sensor data received from a sensor;
a communication circuit to transmit the second command value to the numerical controller; and
a signal relay circuit to allow the first command value transmitted from the numerical controller to pass therethrough to the motor controller without change to the first command value, and allow the feedback data transmitted from the motor controller to pass therethrough to the numerical controller without change to the feedback data, the signal relay circuit being connected to a communication line between the numerical controller and the motor controller.

2. The control device according to claim 1, wherein the communication circuit further transmits the second command value to the motor controller.

3. The control device according to claim 1, further comprising
a memory to store at least one of the first command value, the feedback data, and the sensor data.

4. The control device according to claim 1, wherein at least one of the first command value, the feedback data, and the sensor data is stored in an external memory provided outside.

5. The control device according to claim 1, wherein,
when detecting an abnormality in the first command value, the processor generates a third command value for the motor controller to decelerate the motor, and
the communication circuit transmits the third command value to the motor controller.

6. The control device according to claim 2, further comprising
a memory to store at least one of the first command value, the feedback data, and the sensor data.

7. The control device according to claim 2, wherein at least one of the first command value, the feedback data, and the sensor data is stored in an external memory provided outside.

8. The control device according to claim 3, wherein at least one of the first command value, the feedback data, and the sensor data is stored in an external memory provided outside.

9. The control device according to claim 6, wherein at least one of the first command value, the feedback data, and the sensor data is stored in an external memory provided outside.

10. The control device according to claim 2, wherein,
when detecting an abnormality in the first command value, the processor generates a third command value for the motor controller to decelerate the motor, and
the communication circuit transmits the third command value to the motor controller.

11. The control device according to claim 3, wherein,
when detecting an abnormality in the first command value, the processor generates a third command value for the motor controller to decelerate the motor, and
the communication circuit transmits the third command value to the motor controller.

12. The control device according to claim 6, wherein,
when detecting an abnormality in the first command value, the processor generates a third command value for the motor controller to decelerate the motor, and
the communication circuit transmits the third command value to the motor controller.

13. The control device according to claim 4, wherein,
when detecting an abnormality in the first command value, the processor generates a third command value for the motor controller to decelerate the motor, and
the communication circuit transmits the third command value to the motor controller.

14. The control device according to claim 7, wherein,
when detecting an abnormality in the first command value, the processor generates a third command value for the motor controller to decelerate the motor, and
the communication circuit transmits the third command value to the motor controller.

15. The control device according to claim 8, wherein,
when detecting an abnormality in the first command value, the processor generates a third command value for the motor controller to decelerate the motor, and
the communication circuit transmits the third command value to the motor controller.

16. The control device according to claim 9, wherein,
when detecting an abnormality in the first command value, the processor generates a third command value for the motor controller to decelerate the motor, and
the communication circuit transmits the third command value to the motor controller.

17. A control device comprising:
a command value generation circuitry configured to generate a second command value for a motor on a basis of at least one of:
　a first command value received from a numerical controller;
　feedback data received from a motor controller that controls the motor on the basis of the first command value; and
　sensor data received from a sensor;
a transmission circuitry configured to transmit the second command value to the numerical controller; and
a relay to allow the first command value transmitted from the numerical controller to pass therethrough to the motor controller without change to the first command value, and allow the feedback data transmitted from the motor controller to pass therethrough to the numerical controller without change to the feedback data, the relay being connected to a communication line between the numerical controller and the motor controller.

18. A motor control system comprising:
a numerical controller;
a motor controller to control a motor on a basis of a first command value received from the numerical controller, and transmit feedback data to the numerical controller; and
a controller connectable between the numerical controller and the motor controller;
wherein
the controller includes:
a processor to generate a second command value for the motor on the basis of at least one of:
　the first command value received from the numerical controller;
　the feedback data received from the motor controller; and
　sensor data received from a sensor;
a transmitter to transmit the second command value to the numerical controller; and,
a signal relay circuit to allow the first command value transmitted from the numerical controller to pass therethrough to the motor controller without change to the first command value, and allow the feedback data transmitted from the motor controller to pass therethrough to the numerical controller without change to the feedback data, the signal relay circuit being connected to a communication line between the numerical controller and the motor controller, and
wherein when receiving the second command value, the numerical control device controller corrects the first command value on the basis of the second command value.

* * * * *